US012764799B2

(12) United States Patent
Mu

(10) Patent No.: US 12,764,799 B2
(45) Date of Patent: Oct. 13, 2026

(54) COMMUNICATION METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 652 days.

(21) Appl. No.: 18/012,499

(22) PCT Filed: Jul. 10, 2020

(86) PCT No.: PCT/CN2020/101491

§ 371 (c)(1),
(2) Date: Dec. 22, 2022

(87) PCT Pub. No.: WO2022/006916

PCT Pub. Date: Jan. 13, 2022

(65) Prior Publication Data

US 2023/0254902 A1 Aug. 10, 2023

(51) Int. Cl.
*H04W 74/08* (2024.01)
*H04W 74/0833* (2024.01)

(52) U.S. Cl.
CPC ... *H04W 74/0891* (2013.01); *H04W 74/0833* (2013.01)

(58) Field of Classification Search
CPC ......... H04W 74/0833; H04W 74/0891; H04W 72/51; H04W 74/006; H04W 72/0446; H04W 8/24; H04W 72/0453; H04W 72/20
See application file for complete search history.

(56) References Cited

U.S. PATENT DOCUMENTS 12,047,793 B2 * 7/2024 Kaikkonen ........... H04W 24/08
2013/0163532 A1 * 6/2013 Anderson ............. H04L 5/0053 370/329
2019/0190582 A1 * 6/2019 Guo ..................... H04B 17/327
(Continued)

FOREIGN PATENT DOCUMENTS

CN 104488346 A 4/2015
CN 104619025 A 5/2015
(Continued)

OTHER PUBLICATIONS

PCT/CN2020/101491 English translation of International Search Report dated Apr. 1, 2021, 2 pages.

*Primary Examiner* — Jay P Patel
(74) *Attorney, Agent, or Firm* — Cozen O'Connor

(57) ABSTRACT

In order to better meet access requirements of wireless user equipment (UEs) such as a reduced capability UE or NR-lite, a communication method in a wireless communication network includes receiving random access configuration information, wherein the random access configuration information comprises configuration information of at least one set of random access resources; and determining at least one of random access resources and transmission parameters associated with random access according to the random access configuration information. The random access configuration information may be received according to state information such as capability or channel state information.

14 Claims, 1 Drawing Sheet

(56) References Cited

U.S. PATENT DOCUMENTS

| | | | | |
|---|---|---|---|---|
| 2020/0107235 | A1* | 4/2020 | Peisa | H04B 7/0617 |
| 2021/0058971 | A1* | 2/2021 | MolavianJazi | H04W 56/001 |
| 2021/0076384 | A1* | 3/2021 | MolavianJazi | H04L 5/0053 |
| 2021/0184824 | A1* | 6/2021 | Kwak | H04L 5/0092 |
| 2021/0227586 | A1* | 7/2021 | Huang | H04W 52/242 |
| 2021/0337511 | A1* | 10/2021 | Lei | H04W 72/0453 |
| 2021/0345293 | A1* | 11/2021 | Park | H04L 5/14 |
| 2021/0392525 | A1* | 12/2021 | Kaikkonen | H04W 24/08 |
| 2021/0410047 | A1* | 12/2021 | Nam | H04W 8/22 |
| 2022/0200687 | A1* | 6/2022 | Guo | H04L 5/0023 |
| 2022/0264659 | A1* | 8/2022 | Enbuske | H04W 74/0866 |
| 2023/0060894 | A1* | 3/2023 | Rastegardoost | H04B 7/0695 |
| 2023/0164669 | A1* | 5/2023 | Liu | H04W 48/08 |
| 2023/0337288 | A1* | 10/2023 | Zhou | H04W 74/006 |
| 2024/0008050 | A1* | 1/2024 | Zhou | H04W 56/001 |
| 2024/0389152 | A1* | 11/2024 | Höglund | H04W 48/06 |

FOREIGN PATENT DOCUMENTS

| | | | | |
|---|---|---|---|---|
| CN | 108476479 | A | 8/2018 | |
| CN | 108633050 | A | 10/2018 | |
| WO | WO-2020032646 | A1 * | 2/2020 | H04L 27/2601 |

* cited by examiner

COMMUNICATION METHOD AND APPARATUS

CROSS-REFERENCE TO RELATED APPLICATION

The present application is a U.S. National Stage of International Application No. PCT/CN2020/101491, filed on Jul. 10, 2020, the contents of all of which are incorporated herein by reference in their entireties for all purposes.

BACKGROUND

In an LTE 4G system, in order to support Internet of things (IoT) services, two technologies, machine type communication (MTC) and narrow band Internet of thing (NB-IoT), are proposed. The two technologies are mainly targeted at low-rate and high-delay scenarios, for example, meter reading, environmental monitoring and similar applications. At present, the NB-IoT can only support a maximum rate of several hundred kilobytes, while the MTC can only support a maximum rate of a few megabytes. At the same time, with the continuous development of the IoT services, such as popularity of video surveillance, intelligent home, wearable devices, industrial sensor monitoring, and other services, these services generally require a rate of tens to 100 M, and also have relatively stringent requirements regarding delay. Therefore, the MTC and NB-IoT technologies in the LTE have difficulty meeting the requirements. Based on this situation, a requirement of designing a new user equipment (UE) in 5G new radio (NR) to cover such mid-end IoT devices has been proposed. In current 3GPP standardization, this new terminal type is referred to as a reduced capability UE or NR-lite for short.

SUMMARY

The present disclosure relates to a field of wireless communication technologies, and in particular, to a communication method and a communication apparatus.

In an aspect, the present disclosure provides a communication method, and the method includes: receiving random access configuration information, in which the random access configuration information includes configuration information of at least one set of random access resources; and determining at least one of random access resources and transmission parameters associated with random access according to the random access configuration information.

In another aspect, the present disclosure provides a communication method, and the method includes: sending random access configuration information. The random access configuration information includes configuration information of at least one set of random access resources. The random access configuration information is used to indicate at least one of random access resources and transmission parameters associated with random access.

In yet another aspect, the present disclosure provides a communication apparatus, and the apparatus includes: a communication module configured to receive random access configuration information, in which the random access configuration information includes configurations corresponding to at least one set of random access resources; and a processing module configured to determine at least one of random access resources and transmission parameters associated with random access according to the random access configuration information.

Beneficial effects brought by the technical solutions according to the embodiments of the present disclosure will be described in detail in the following Detailed Description in combination with specific embodiments, and will not be expanded herein.

BRIEF DESCRIPTION OF THE DRAWINGS

In order to illustrate the technical solutions according to the embodiments of the present disclosure more clearly, the accompanying drawings to be used in the descriptions of the embodiments of the present disclosure will be briefly introduced below.

DETAILED DESCRIPTION

Figure 1:
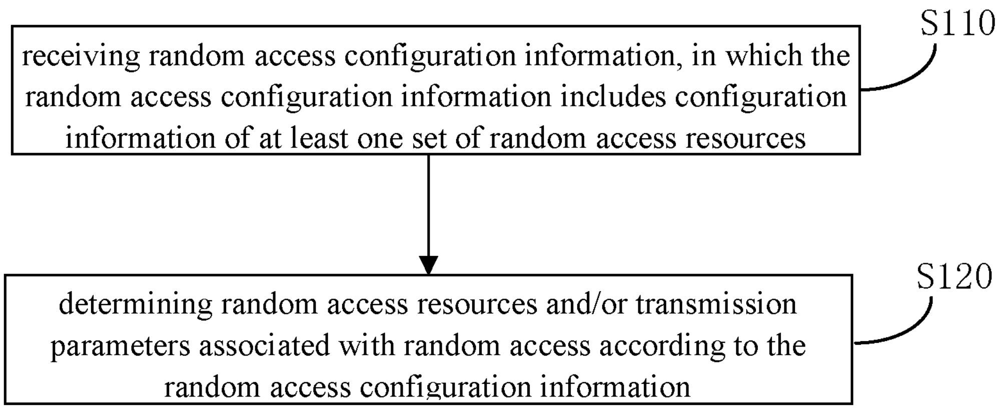
FIG. 1 is a schematic flow chart of a communication method according to the present disclosure.

Embodiments of the present disclosure will be described in detail below, and the examples of the embodiments are illustrated in the drawings, wherein the same or similar elements and the elements having same or similar functions are denoted by same or similar reference numerals throughout the descriptions. The embodiments described below with reference to the drawings are illustrative, which are intended only to explain the present disclosure and cannot be interpreted as limitations to the present disclosure.

Those skilled in the art may understand that the singular forms of "a/an", "one", "the", and "said" used herein are intended to include plural forms as well, unless otherwise stated. It should be further understood that the wording "include/comprise" used in the specification of the present disclosure indicates the presence of the features, integers, steps, operations, elements and/or components, but does not exclude the presence or addition of one or more of other features, integers, steps, operations, elements, components and/or their combinations. It should be understood that when an element is referred to as being "connected" or "coupled" to another element, the element may be directly connected to or coupled to the another element, or an intervening element may be disposed therebetween. In addition, "connected" or "coupled" used herein may include wireless connection or wireless coupling. The wording "and/or" used herein includes all or any of one or more associated listed items or combinations thereof.

Unless otherwise defined, all terms (including technical and scientific terms) used herein have the same meaning as commonly understood by those ordinary skilled in the art to which the present disclosure belongs. The terms "user equipment", "terminal", and "terminal device" as used herein include a device of a wireless signal receiver, which includes a device of a wireless signal receiver without a transmission capability, and a device having receiving and transmission hardware, which can perform bi-directional communication on a bi-directional communication link. The device may include: a cellular or another communication device, such as a cellular or another communication device with a single-line display or a multi-line display or without a multi-line display; a personal communications system (PCS), which may combine voice, data processing, fax and/or data communication capabilities; a personal digital assistant (PDA), which may include a radio frequency receiver, a pager, Internet/intranet access, a network browser, a notebook, a calendar and/or a global positioning system (GPS) receiver; a conventional laptop and/or handheld computer or another device, which includes a conventional laptop and/or handheld computer or another device having and/or including a radio frequency receiver. The terms "terminal", "terminal device", and "user equipment" used herein may be portable, transportable, and mounted on a vehicle (aviation, shipping and/or land), or adapts and/or is configured to operate locally, and/or operate at any other position of the earth and/or space in a distributed form. The terms "terminal", "terminal device", and "user equipment" used herein may also be a communication terminal, an Internet terminal and a music/video playing terminal, such as a PDA, a mobile Internet device (MID) and/or a mobile phone with a music/video playback function, or may also be a device such as an intelligent television or a set top box.

Similar to an IoT device in a LTE, a 5G-based NR-lite is generally required to meet requirements such as low costs, low complexity, a certain extent of coverage enhancement, and power saving. However, the current NR is designed for high-end terminals such as high-rate and low-delay terminals. Therefore, the current design cannot meet the requirements of the NR-lite. Therefore, the current NR system is required to be transformed to meet the requirements of the NR-lite.

In order to better understand and illustrate the various implementations according to the present disclosure, the technologies associated with the present disclosure are first briefly introduced below.

The 5G NR-lite is generally required to meet requirements such as low costs, low complexity, a certain extent of coverage enhancement, and power saving. However, a current NR system is designed for high-end terminals such as high-rate and low-delay terminals, which cannot well apply to or meet the requirements of the NR-lite. With respect to this situation, the current NR system is required to be transformed to meet the requirements of the NR-lite. For example, in order to meet the requirements such as low costs and low complexity, a radio frequency (RF) bandwidth of NR-IoT may be limited to, for example, 5 MHz or 10 MHz, or a size of the buffer of the NR-lite is limited, so as to limit a size of a transmission block received each time, and so on. For the power saving, a possible optimization direction is to simplify a communication process, and reduce a number of times a NR-lite user detects a downlink control channel, etc.

In the current NR system, a user's access configuration is configured by a random access channel (RACH)-ConfigCommon information element. The configuration is mainly divided into two parts. The first part is to configure a total quantity of random access resources available in a cell. Time units, frequency resources, and random access preambles for random access by the user are included therein. The second part is to define a mapping relationship between SSB and the random access resource. According to the mapping relationship, the user may determine a corresponding random resource subset according to a measured SSB meeting a condition. At the same time, a condition of accessing the random access resource may also be specified in remaining minimum system information (RMSI), and the user may measure SSB-based RSRP, and compare a measured RSRP measurement value with an RSRP threshold specified in the RMSI to determine whether to allow to access the cell by using the corresponding random access resource.

For NR-lite user equipment, the coverage capability is reduced due to the lower terminal costs. At the same time, even for normal NR users, coverage may also be limited at an edge of the cell. Therefore, it is difficult to meet coverage requirements of different users by using only one set of random access resources in the whole cell.

With respect to the problems existing in the current communication mode, in order to better meet communication requirements, the present disclosure provides a communication method, apparatus and device, and a storage medium. In order to better understand and describe the solutions according to the present disclosure, principles of solutions according to the present disclosure are first described below.

In order to better meet access requirements of UE with different coverage capabilities, the present disclosure provides a new configuration solution for random access resources. That is, configurations of a plurality of sets of random access resources may be supported in a cell. A specific implementation of the configurations of the plurality of sets of random access resources is not limited in the present disclosure, as long as some or all of the random access resources corresponding to different configurations are different. For example, the configurations of the plurality of sets of random access resources may correspond to different SSB-based Rsrp thresholds or values, and the UE may select corresponding random access resources according to measured SSB-based Rsrp measurement values and thresholds. In another example, the configurations of the plurality of sets of random access resources may include configurations corresponding to different UE types. That is, different types of UE may correspond to configurations of the corresponding random access resources, respectively. For example, there may be at least one set of corresponding random access resources for a normal UE, and there may be at least one set of corresponding random access resources for the NR-lite. Certainly, configurations of random access resources used by different types of UE may be completely independent, unshared, or partially shared.

Based on the above configuration principle according to the present disclosure, in practical applications, a base station may support the configuration of at least one type of random access resource. When the base station sends random access configuration information, the base station may send the configuration information of the corresponding random access resource to the UE by using different configuration policies or in a protocol agreement manner. For example, the base station supports the configurations of the plurality of sets of random access resources. The base station may send the configuration information corresponding to each set of random access resources supported by the base station or send part of the configurations supported by the base station. For example, the base station supports configurations corresponding to three sets of random access resources, and when sending the random access configuration information, the base station may send the configuration information of at least one set of random access resources supported by the base station.

Correspondingly, when receiving the configuration information of the random access resource sent by the base station, one UE may receive the configuration information of the plurality of sets of random access resources sent by the base station, or receive, according to state information of the UE, the configuration of the random access resource corresponding to the state information. For example, the base station sends configuration information corresponding to two sets of random access resources, in which one set is the configuration of the random access resource corresponding to the normal UE and the other set is the configuration of the random access resource corresponding to the NR-lite. When receiving the configuration information of the random access resource, the UE may receive the two sets of configurations, and then determine the random access resource and/or a transmission parameter associated with random access to initiate random access according to the configurations corresponding to a type of the UE. The UE may also receive only one set of corresponding configurations according to its device type.

It may be understood that the above description is only an illustrative description of the principles of the solutions according to the present disclosure, which does not constitute any limitation to the solutions of the present disclosure.

The solutions according to the present disclosure are described below in conjunction with some embodiments.

FIG. 1 is a flow chart of a communication method according to the present disclosure. The method may be performed by a UE. As shown in FIG. 1, the method may include the following steps.

At step S110, random access configuration information is received, the random access configuration information includes configuration information of at least one set of random access resources.

At step S120, random access resources and/or transmission parameters associated with random access are determined according to the random access configuration information.

It may be understood that a set of random access resources refers to random access resources required by the UE to initiate random access, including, but not limited to, random access time resources, random access frequency domain resources, and random access preambles, and so on. When initiating a random access request, the UE is required to determine resources to initiate the random access request and/or transmission parameters associated with random access according to the acquired random access configuration information. The transmission parameters associated with random access refer to related parameters based on which the UE initiates the random access request, including but not limited to, a transmission power and a power ramping step.

In some embodiments, the random access configuration information received by the UE may be random access configuration information sent by the base station or part of the random access configuration information sent by the base station. For example, the base station sends configuration information corresponding to a plurality of sets of random access resources, and the UE may receive the configuration information of the plurality of sets of random access resources or may receive only the configuration corresponding to one or several of the plurality of sets of random access resources. As can be known from the foregoing description, the random access configuration information sent by the base station may also include the configuration corresponding to at least one set of random access resources in all the configurations supported by the base station.

In an embodiment of the present disclosure, receiving by the UE the random access configuration information includes: receiving the random access configuration information according to first state information of the UE.

In some embodiments, the first state information of the UE may include, but is not limited to, at least one of capability information and channel state information. For example, the state information may further include other information capable of representing a network coverage requirement of the UE, or other information capable of representing a random access capability of the UE, for example, a communication environment where the UE is currently located, such as a type of a cell where the UE is currently located and a location where the UE is currently located.

Since different states of the UE correspond to different network coverage requirements, in order to meet different coverage requirements, the different states of the UE may correspond to different random access resources. In other words, for the different states of the UE, the base station may support configurations of different random access resources, to better meet the coverage requirements of the UE with different states. When receiving the random access configuration information sent by the base station, the UE may receive the configuration information of the corresponding random access resource according to the current state information of the UE.

In some embodiments, the capability information of the UE may include, but is not limited to, one or more of information such as a device type (for example, a normal UE or a NR-lite), a corresponding bandwidth (a receiving bandwidth and/or a transmission bandwidth), and a number of antennas (data of receiving antennas and/or data of transmitting antennas).

The UE with different capabilities correspond to different network coverage requirements, for example, the NR-lite generally requires stronger network coverage than the normal UE. Therefore, the system may support configurations of a plurality of sets of different random access resources. Each configuration corresponds to a different UE capability. When receiving the random access configuration information sent by the base station, the UE may receive the corresponding configuration information according to the capability information of the UE.

As an alternative, for example, the random access configuration information sent by the base station includes configuration information of at least one set of random access resources corresponding to a first type of UE (e.g., the normal UE) and configuration information of at least one set of random access resources corresponding to a second type of UE (e.g., the NR-lite), the UE may receive, according to a device type of the UE, the configuration information of the random access resources corresponding to the type.

In some embodiments, the UE may receive only the configuration information of the random access resources corresponding to the type of the UE. That is, the step includes: receiving the random access configuration information according to the first state information of the UE.

In some other embodiments, the UE may receive the configuration information of all the random access resources, and determine the configuration information of the random access resources corresponding to the type of the UE. That is, the step includes: receiving, by the UE, the random access configuration information, and determining the random access configuration information corresponding to the UE according to the first state information of the UE. Implementations of the embodiment may be obtained with reference to the description hereinafter.

It is to be noted that, as another alternative, each of the plurality of sets of random access resources also may not be classified based on the state information of the UE or other information. That is, the configurations of the plurality of sets of random access resources are generic, but the configurations of individual set of random access resources correspond to different random access resources. In addition, the configurations of the plurality of sets of random access resources may be independent, unshared, or partially shared. For example, at least two of the plurality of sets of random access resources may share configurations of time resources and configurations of frequency domain resources, while configurations of other resources such as random access codes are configured independently.

In an embodiment of the present disclosure, the channel state information includes, but is not limited to, SSB-based Rsrp. That is, the channel state information of the random access channel is a parameter rsrp-ThresholdSSB in a communication standard. The parameter is an L1-RSRP threshold and used to determine whether a candidate beam is used by the UE to attempt to compete for private access to compensate for beam failure, which is clearly defined in the communication standard 3GPP 38.331-f70 and the communication standard TS 38.213-f70. Such communication standards can be obtained from 3GPP or ETSI, and details are not described herein again.

In some embodiments, the channel state information may also be a channel quality indication (CQI) or another channel parameter capable of representing a channel state.

In any embodiment or step of the embodiments of the present disclosure, the random access configuration information includes configuration information of two or more sets of random access resources.

In any embodiment or step of the embodiments of the present disclosure, the configuration information of each set of random access resources includes a channel parameter threshold of the channel state information.

In some embodiments, the channel parameter threshold of the channel state information may include, but is not limited to, an SSB RSRP threshold.

The channel parameter threshold may include an upper threshold and/or a lower threshold. For example, the configuration information of each set of random access resources includes the SSB RSRP threshold. In this case, the SSB RSRP threshold may include an SSB RSRP upper threshold and/or an SSB RSRP lower threshold.

It is to be noted that, regarding the upper threshold and the lower threshold, for the configuration information of each set of random access resources, part of the random access resources may correspond to the lower threshold, some of the random access resources correspond to the upper threshold, and some of the random access resources correspond to the upper threshold and the lower threshold. Certainly, each set of random access resources may also correspond to both the upper threshold and the lower threshold.

In any embodiment or step of the embodiments of the present disclosure, the random access configuration information sent by the base station may include a correspondence between at least one SSB-based Rsrp threshold and configuration information of random access resources corresponding to the threshold. When receiving the random access configuration information, the UE may measure the SSB-based Rsrp, receive the configuration information of the random access resources corresponding to the threshold that a measurement value meets according to the measurement value and the above correspondence, and initiate a random access request according to the random access resources corresponding to the received configuration information.

It may be understood that, in practical applications, the UE receives the random access configuration information according to the state information of the UE. Specifically, which information of the capability information and the channel state information of the UE to be based on may be pre-configured according to protocol agreement or determined according to indication information sent by the base station, or may be determined according to a related identifier in a data packet sent by the base station to carry the configuration information of the random access resources. For example, the configurations of different random access resources are distinguished according to the types of UE. When the base station sends the data packet carrying the random access configuration information, it may be identified in a packet head of the data packet or in other manners that the configuration information corresponds to the configuration information of which type of the UE. The UE may receive the corresponding configuration information according to the device type of the UE.

In an embodiment of the present disclosure, determining, by the UE, random access resources and/or transmission parameters associated with random access according to the random access configuration information may include: determining, according to second state information of the UE, configuration information corresponding to the second state information in configuration information of at least one set of random access resources; and determining, according to the configuration information corresponding to the second state information, the random access resources and/or the transmission parameters associated with random access.

Similarly, the second state information of the UE may include, but is not limited to, at least one of the capability information and the channel state information. The capability information may include, but is not limited to, one or more of information such as a device type, a corresponding receiving bandwidth, a corresponding transmission bandwidth, a number of receiving antennas, and a number of transmitting antennas. The channel state information may include, but is not limited to, SSB-based Rsrp.

As can be known from the foregoing description, the random access configuration information received by the UE may include configuration information of a set of random access resources, or include configuration information of a plurality of sets of random access resources, and the received configuration information may be all or part of the configuration information sent by the base station. In this case, it is possible that the configuration information acquired by the UE is not all available to the UE. For example, the UE receives the configuration information of the random access resources corresponding to the first type of UE, but the UE is the second type of UE. In another example, the UE receives the configuration information of the plurality of sets of random access resources. Corresponding to the above possible situations, as another solution, the UE may determine the corresponding configuration information according to the state information of the UE after receiving the random access configuration information.

Based on the solutions according to the present disclosure, the base station may support the configurations of a plurality of random access resources, when sending the configuration information of the random access resources to the UE, the base station may send at least one of the plurality of sets of configurations supported by the base station, when receiving the configuration information, the UE may receive all the configuration information sent by the bases station or receive the corresponding configuration information according to the state information of the UE, and after receiving the configuration information, the UE may further determine the configuration information according to the received configuration information or according to the state information of the UE, to initiate the random access request by using the random access resources corresponding to the configuration information meeting the requirement and/or the transmission parameters associated with the random access.

An embodiment of the present disclosure further provides a configuration method for determining random access configuration information, which includes receiving the random access configuration information. The random access configuration information includes at least first random access configuration information corresponding to a first type of UE and second random access configuration information corresponding to a second type of UE.

In some possible embodiments of the present disclosure, the first type of UE is a normal UE, for example, a UE supporting NR; and the second type of UE may be a UE supporting NR-lite. Certainly, the above illustration is not a limitation to the scope of the embodiments of the present disclosure, that is, the first type of UE is not of exactly the same type as the second type of UE. The UE supporting NR and the UE supporting NR-lite are just examples of two UEs of not exactly the same type.

In some possible embodiments of the present disclosure, the first random access configuration information is exactly the same as the second random access configuration information. That is, the first type of UE and the second type of UE adopt identical random access configuration information. That is, the first random access configuration information and the second random access configuration information are identical information, and the UE receives only one of the first random access configuration information and the second random access configuration information, which is irrelevant to the type of the UE.

In some other possible embodiments of the present disclosure, the first random access configuration information is not exactly the same as the second random access configuration information. That is, the random access configuration information corresponding to the first type of UE and the random access configuration information corresponding to the second type of UE are different in at least one field or configuration parameter. That is, a normal NR user shares a part of random access configuration information with an NR-lite user, and another part of random access parameters are configured independently. For example, the two types of users share configurations of time and frequency resources, while the used preambles are independently configured. In some other possible embodiments of the present disclosure, the first random access configuration information is totally different from the second random access configuration information. That is, the random access configuration information corresponding to the first type of UE and the random access configuration information corresponding to the second type of UE are different in all fields or configuration parameters. The normal NR user and the NR-lite user use completely independent random access configuration information. That is, one or more sets of corresponding random access resources are provided for the NR user, and one or more sets of corresponding random access resources are provided for the NR-lite user. Resource configurations used by the two types of users are completely independent and unshared.

In some embodiments, the UE may receive only the configuration information of the random access resources corresponding to the type of the UE. That is, the step includes: receiving the random access configuration information according to the first state information of the UE.

In some other embodiments, the UE may receive the configuration information of all the random access resources, and determine the configuration information of the random access resources corresponding to the type of the UE. That is, the step includes: receiving, by the UE, the random access configuration information, and determining the random access configuration information corresponding to the UE according to the first state information of the UE.

In each of the above embodiments, the random access configuration information includes one or more pieces of first random access configuration information corresponding to the first type of UE and one or more pieces of second random access configuration information corresponding to the second type of UE.

In other words, each UE type may correspond to one or more sets of random access resources. For example, the first type of UE and the second type of UE each may correspond to configuration information of two sets of random access resources. When the UE receives the random access configuration information, if the UE is the first type of UE, the UE may receive only the configuration information corresponding to the first type of UE. When receiving a plurality of sets of configuration information of the corresponding type, one set of configurations used currently may be determined from the plurality of sets of configuration information according to the state information of the UE. Certainly, the UE may also receive the configuration information corresponding to the first type of UE and the configuration information corresponding to the second type of UE, and then determine the configuration information corresponding to the UE according to the type of the UE. When determining the configuration information corresponding to the plurality of sets of random access resources, the UE may further determine used configuration information from the configuration information corresponding to the plurality of sets of random access resources according to the state information of the UE.

In any embodiment of the present disclosure, the random access configuration information includes configuration information of two or more sets of random access resources.

In any embodiment of the present disclosure, at least one configuration parameter in the configuration information of each set of random access resources is configured differently. In other words, one or more configuration parameters in the configuration information of different random access resources may be configured differently.

In some embodiments, the configuration parameter includes: a random access channel common configuration; a random access channel generic configuration; a physical random access channel configuration index; at least one of configuration parameters associated with random access time domain resource and/or frequency domain resource configurations; a configuration parameter associated with a random access preamble; and a random access response window width.

In some embodiments, the configuration parameter associated with the random access preamble includes at least one of the followings: a random access preamble configuration parameter; a random access preamble maximum transmission number; random access preamble transmission power; and a random access preamble transmission power ramping step.

In any embodiment of the present disclosure, the random access configuration information includes at least two random access resources carried in at least two corresponding random access channel common configurations (such as RACH-ConfigCommon) of remaining minimum system information (RMSI); or, the random access configuration information includes at least two of the following parameters carried in at least two random access channel generic configurations (such as rach-ConfigGeneric): a random access time domain resource parameter, a random access frequency domain resource parameter, and an access parameter of random access; or, the random access configuration information includes at least two random access time configuration parameters corresponding to at least two physical random access channel configuration index (such as prach-ConfigurationIndex) parameters; or, the random access configuration information includes at least two sets of random access frequency resource parameters; or, the random access configuration information includes at least two sets of random access preambles; or, a maximum transmission power parameter (such as PreambleTransMax) of first information Msg.1 corresponds to at least two different configuration values; or, a power ramping step parameter (such as PowerRampingStep) of first information Msg.1 corresponds to at least two different configuration values; or, a random access response window width (ra-ResponseWindow) corresponds to at least two different configuration values.

The communication method according to the present disclosure is described below from the side of the base station. For the side of the base station, the communication method according to the present disclosure may include: sending random access configuration information. The random access configuration information includes configuration information of at least one set of random access resources. The random access configuration information is used to indicate random access resources and/or transmission parameters associated with random access.

In some embodiments, for different application scenarios or base station configurations, one base station may support configurations of a plurality of sets of random access resources or configurations of one set of random access resources. The random access configuration information sent by the base station may include the configurations of the at least one set of random access resources supported by the base station. For example, the base station may send the configurations corresponding to each set of random access resources supported by the base station, or measure and determine, according to the configurations of the base station, how many sets of random access resources' corresponding configurations are specifically included in the sent random access configuration information.

In an embodiment of the present disclosure, the base station may support configurations corresponding to at least two sets of random access resources, and the random access configuration information sent by the base station may include the configuration information of at least one set of random access resources of the at least two sets of random access resources supported by the base station.

For example, for different UE types, the base station may support different random access configurations. As an alternative, the base station may send configuration information of random access resources corresponding to various UE types, or send configuration information of random access resources corresponding to one UE type.

In an embodiment of the present disclosure, the random access configuration information includes configuration information of at least one set of random access resources corresponding to at least one type of state information of the UE.

As another solution, different state information of the UE may correspond to respective random access resources. When the random access configuration information is sent to the UE, the configuration information of the random access resources corresponding to one or more types of state information of the UE may be sent. In this case, when receiving the configuration information sent by the base station, one UE may receive, based on the state information of the UE, the configuration information corresponding to the state information of the UE in the random access configuration information sent by the base station, or receive the random access configuration information sent by the base station and then determine, based on the state information of the UE, the configuration information corresponding to the state information of the UE in the received configuration information. In all embodiments of the present disclosure, the state information of the UE may be the type of the UE. In some embodiments, the type of the UE includes at least the first type and the second type. In some embodiments, the first type of UE is the normal UE, for example, the UE supporting NR; and the second type of UE may be the UE supporting NR-lite.

As can be known from the foregoing description, the state information of the UE may include, but is not limited to, at least one of the followings: the capability information of the UE; and the channel state information.

In some embodiments, the capability information of the UE may include, but is not limited to, one or more of information such as the device type, the corresponding receiving bandwidth, the corresponding transmission bandwidth, the number of receiving antennas, and the data of transmitting antennas. The channel state information may include, but is not limited to, the SSB-based Rsrp.

In an embodiment of the present disclosure, at least two sets of supported random access resources include random access resources corresponding to channel parameter thresholds (such as SSB-based Rsrp thresholds) of at least two types of channel state information.

In some embodiments, the threshold may include an upper threshold and/or a lower threshold.

In some embodiments, the configurations of the plurality of sets of random access resources supported by the base station may be associated with the Rsrp thresholds. That is, different thresholds correspond to different random access resources. When sending the random access configuration information, the base station may send the configurations of the random access resources corresponding to at least one SSB-based Rsrp threshold, for example, based on a correspondence between the SSB-based Rsrp threshold and the configurations corresponding to the threshold. Accordingly, when receiving the configuration information of the random access resources, the UE may receive, according to a SSB-based Rsrp measurement value measured by the UE, the configuration information corresponding to a threshold that the measurement value meets, or when the received random access configuration information includes configurations of random access resources corresponding to at least one threshold, the UE may determine, according to the SSB-based Rsrp measurement value measured by the UE, available configurations (i.e., configurations where the measurement value meets the requirement of the threshold) and determine the random access resources and the transmission parameters associated with random access.

In an embodiment, for a certain random access resource or some random access resources, the corresponding SSB-based Rsrp threshold may have a corresponding lower limit, and a corresponding upper limit may also be specified for the corresponding SSB-based Rsrp threshold. The user may select the configurations of the corresponding random access resources according to the Rsrp measurement value.

As an example, Table 1 shows a correspondence between a plurality of SSB-based Rsrp thresholds and configurations of random access resources corresponding to the thresholds. As shown in Table 1, the 1st column in the table (i.e., a column corresponding to the random access resources in the table) indicates different random access resource configurations, for example, random access resource configuration 0 (in the example, this configuration is identified by RACH- ConfigCommon), random access resource configuration 1 (identified by RACH-ConfigCommon-CE1), and random access resource configuration 2 (identified by RACH-ConfigCommon-CE2). Each random access resource configuration corresponds to a different random access resource. The 2nd column in the table represents different SSB-based Rsrp thresholds (i.e., Rsrp-SSB thresholds shown in the table). For example, the Rsrp-SSB threshold corresponding to random access resource configuration 0 is X, where X is a lower limit of the threshold, and the UE can initiate the random access according to the random access resources corresponding to the configuration only when Rsrp measured by the UE is greater than the threshold (>X as shown in the table). In the example, the Rsrp-SSB threshold corresponding to random access resource configuration 1 includes a lower threshold N and an upper threshold M. That is, a random access resource corresponding to random access resource configuration 1 can be used only when the Rsrp measurement value is greater than N and less than M.

TABLE 1

| random access resource | Rsrp-SSB threshold |
|---|---|
| random access resource configuration 0 (RACH-ConfigCommon) | >X |
| random access resource configuration 1 (RACH-ConfigCommon-CE1) | M > Rsrp-SSB threshold > N |
| random access resource configuration 2 (RACH-ConfigCommon-CE2) | A > Rsrp-SSB threshold > B |

In an embodiment of the present disclosure, the random access configuration information includes configuration information of two or more sets of random access resources.

In an embodiment of the present disclosure, at least one configuration parameter in the configuration information of each of the at least two sets of supported random access resources is configured differently.

It may be understood that the random access configuration information sent by the base station may include configuration information of one set or at least two sets of random access resources. When the sent configuration information includes configuration information of two or more sets of random access resources, one or more configuration parameters in the configuration information of the two or more sets of random access resources may be configured differently.

A specific implementation of configurations of the plurality of sets of random access resources is not limited in the embodiment of the present disclosure. Some or all of the random access resources corresponding to the configurations of any two sets of random access resources may be different.

In some embodiments, the configuration parameter may include: a random access channel common configuration; a random access channel generic configuration; a physical random access channel configuration index; at least one of configuration parameters associated with random access time domain resource and/or frequency domain resource configurations; a configuration parameter associated with a random access preamble; and a random access response window width.

In some embodiments, the configuration parameter associated with the random access preamble includes, but is not limited to, at least one of the followings: a random access preamble configuration parameter; a random access preamble maximum transmission number; a random access preamble transmission power; and a random access preamble transmission power ramping step.

The random access channel common configuration is used to configure random access channel configurations and parameters associated with random access. A complete set of random access resources required to initiate the random access may be determined based on this configuration parameter. The random access channel generic configuration is a configuration parameter used to set random access time and frequency resources and other access parameters. The physical random access channel configuration index is one of parameters used to configure the random access time configuration. Information such as a time resource where a physical random access channel resource is located and a cycle of a physical random access channel may be obtained based on this parameter. The configuration parameters associated with random access time domain resources and/or frequency domain resources are parameters used to determine related information of the random access time domain/frequency domain resources. For example, the configuration parameter associated with the random access frequency domain resources may include related parameters indicating positions of frequency domain resources of the physical random access channel, for example, a parameter used to indicate a starting position in a frequency domain (msg.1-Start for a NR system), and a parameter used to indicate the time of access to the physical random access channel in the frequency domain at a same moment (msg.1-FDM for the NR system).

The random access response window width is a parameter used by the UE to determine a size of an msg2 (a random access response message) receiving window during the random access. The random access preamble configuration parameter is a configuration parameter used for the random access preamble (also known as a random access preamble code). The random access preamble used to initiate the random access may be determined according to this parameter. The random access preamble maximum transmission number is used by the UE to determine a maximum number of allowable transmissions of the random access preamble. The random access preamble transmission power ramping step is an adjustment step of a transmission power of the random access preamble during the random access of the UE.

It is to be noted that, for different radio access technology (RAT) communication systems, names of parameters may be different for specific identical functions or for parameters capable of implementing a certain or some identical functions. For example, taking the NR system as an example, the random access channel common configuration is RACH-ConfigCommon in RMSI, the random access channel generic configuration is rach-ConfigGeneric, and the physical random access channel configuration index is prach-ConfigurationIndex, the random access response window width is ra-ResponseWindowsize, the random access preamble maximum transmission number is PreambleTransMax, and the random access preamble transmission power ramping step is PowerRampingStep.

In any embodiment of the present disclosure, the random access configuration information includes configuration information of two or more sets of random access resources.

The configuration information of each set of random access resources includes a channel parameter threshold of the channel state information, for example, an SSB RSRP threshold.

In any embodiment of the present disclosure, the SSB RSRP threshold may include: an SSB RSRP upper threshold and/or an SSB RSRP lower threshold.

In any embodiment of the present disclosure, the random access configuration information includes at least two random access resources carried in at least two corresponding random access channel common configuration units (such as RACH-ConfigCommon configuration units) of remaining minimum system information (RMSI); or, the random access configuration information includes at least two of the following parameters carried in at least two random access channel generic configurations (such as rach-ConfigGeneric): a random access time domain resource parameter, a random access frequency domain resource parameter, and an access parameter of random access; or, the random access configuration information includes at least two random access time configuration parameters corresponding to at least two physical random access channel configuration index (such as prach-ConfigurationIndex) parameters; or, the random access configuration information includes at least two sets of random access frequency resource parameters; or, the random access configuration information includes at least two sets of random access preambles; or, at least two different maximum transmission power parameters of first information Msg.1, for example, PreambleTransMax; at least two step parameters PowerRampingStep for power ramping of first information Msg.1; and at least two random access response window widths, for example, ra-ResponseWindow.

Taking the NR system as an example, configuration implementations of different granularities may be adopted for implementations of the configurations of the plurality of sets of random access resources. For example, the following implementations are available.

In Option 1, i.e., Manner 1, the plurality of sets of random access resources may be represented as configuration units with a plurality of RACH-ConfigCommon in RMSI.

In Option 2, a plurality of sets of rach-ConfigGeneric used to set random access time and frequency resources and other access parameters may be configured.

In Option 3, a plurality of sets of random access time configurations may be configured. For example, a plurality of prach-ConfigurationIndex parameters are configured.

In Option 4, a plurality of sets of random access frequency resources are configured: msg.1-FDM and msg.1-Start-frequency domain resources.

In Option 5, a plurality of sets of random access preambles are configured.

As another alternative, one or more parameters in the plurality of sets of random resource configurations may also be configured as a plurality of sets, so that appropriate parameters can be independently configured for the user equipment with different coverage capabilities. For example, parameters such as PreambleTransMax, PowerRampingStep, and ra-ResponseWindow may correspond to a plurality of configuration values, respectively.

The plurality of sets of random access resources can be configured based on the principles and the solutions according to the present disclosure, so as to better meet the requirements of the user equipment with different communication capabilities.

Figure 2:
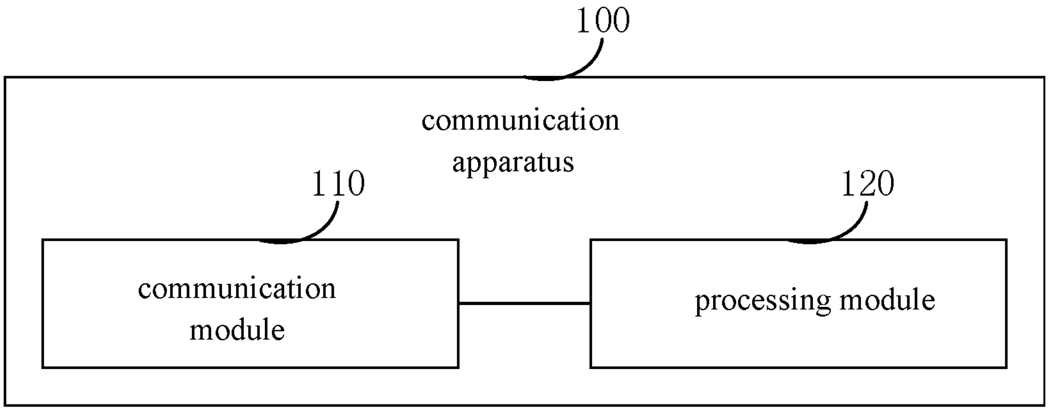
FIG. 2 is a schematic diagram of a communication apparatus according to the present disclosure.

Based on the same principle as the method according to the present disclosure, the present disclosure further provides a communication apparatus. As shown in FIG. 2, the communication apparatus 100 may include a communication module 110 and a processing module 120. The communication apparatus may be specifically implemented as a user equipment.

The communication module 110 is configured to receive random access configuration information, and the random access configuration information includes configurations corresponding to at least one set of random access resources.

The processing module 120 is configured to determine random access resources and/or transmission parameters associated with random access according to the random access configuration information.

In some embodiments, the communication module 110 may be configured to receive the random access configuration information according to first state information of a UE.

In some embodiments, the first state information includes at least one of the followings: capability information; and channel state information.

In some embodiments, the processing module 120 may be configured to determine, according to second state information of the UE, configuration information corresponding to the second state information in the configuration information of the at least one set of random access resources; and determine, according to the configuration information corresponding to the second state information, the random access resources and/or the transmission parameters associated with random access.

In some embodiments, the second state information includes at least one of the followings: capability information; and channel state information.

In some embodiments, the capability information includes at least one of the followings: a device type; a corresponding receiving bandwidth; a corresponding transmission bandwidth; a number of receiving antennas; and data of transmitting antennas.

In some embodiments, the channel state information includes SSB-based Rsrp.

In some embodiments, the random access configuration information includes configuration information of two or more sets of random access resources.

In some embodiments, the configuration information of each set of random access resources includes a channel parameter threshold of the channel state information.

In some embodiments, the channel parameter threshold of the channel state information includes a threshold of the SSB-based RSRP.

In some embodiments, the channel parameter threshold includes an upper threshold and/or a lower threshold.

In some embodiments, at least one configuration parameter in the configuration information of each set of random access resources is configured differently.

In some embodiments, the configuration parameter includes: a random access channel common configuration; a random access channel generic configuration; a physical random access channel configuration index; at least one of configuration parameters associated with random access time domain resource and/or frequency domain resource configurations; a configuration parameter associated with a random access preamble; and a random access response window width.

In some embodiments, the configuration parameter associated with the random access preamble includes at least one of the followings: a random access preamble configuration parameter; a random access preamble maximum transmission number; a random access preamble transmission power; and a random access preamble transmission power ramping step.

The present disclosure further provides a communication apparatus. The apparatus includes a communication module configured to send random access configuration information, and the random access configuration information includes configurations corresponding to at least one set of random access resources. The random access configuration information is used to indicate random access resources and/or transmission parameters associated with random access. The apparatus may be specifically implemented as a base station or a network entity in the base station.

In some embodiments, the random access configuration information includes configuration information of at least one set of random access resources of at least two sets of supported random access resources.

In some embodiments, the random access configuration information includes configuration information of at least one set of random access resources corresponding to at least one type of state information of a UE.

In some embodiments, the state information of the UE includes at least one of the followings: capability information of the UE; and channel state information corresponding to the UE.

In some embodiments, the capability information of the UE includes at least one of the followings: a device type; a corresponding receiving bandwidth; a corresponding transmission bandwidth; a number of receiving antennas; and data of transmitting antennas.

In some embodiments, the channel state information includes SSB-based Rsrp.

In some embodiments, the at least two sets of supported random access resources include random access resources corresponding to channel parameter thresholds of at least two types of channel state information.

In some embodiments, the channel parameter threshold of the channel state information includes a threshold of the SSB-based Rsrp.

In some embodiments, the channel parameter threshold includes an upper threshold and/or a lower threshold.

In some embodiments, the random access configuration information includes configuration information of two or more sets of random access resources.

In some embodiments, at least one configuration parameter in the configuration information of each set of random access resources is configured differently.

In some embodiments, the configuration parameter includes: a random access channel common configuration; a random access channel generic configuration; a physical random access channel configuration index; at least one of configuration parameters associated with random access time domain resource and/or frequency domain resource configurations; a configuration parameter associated with a random access preamble; and a random access response window width.

In some embodiments, the configuration parameter associated with the random access preamble includes at least one of the followings: a random access preamble configuration parameter; a random access preamble maximum transmission number; a random access preamble transmission power; and a random access preamble transmission power ramping step.

It is to be noted that the apparatus according to the embodiments of the present disclosure is an apparatus that may perform the method according to the embodiments of the present disclosure. Therefore, based on the method according to the embodiments of the present disclosure, those skilled in the art can learn specific implementations of the apparatus in the embodiments of the present disclosure and various variations. Therefore, a manner in which the apparatus implements the method in the embodiments of the present disclosure is not described in detail herein, provided that all apparatuses used when those skilled in the art implements the method in the embodiments of the present disclosure fall within the protection scope of the present disclosure. The modules included in the apparatus may be specifically implemented by software and/or hardware.

The present disclosure further provides a communication device. The communication device may include at least one memory and at least one processor. The memory stores a computer program. The processor may be configured to, when executing the computer program stored in the memory, perform the method according to any one of the embodiments of the present disclosure, for example, any one of the communication methods performed by the UE according to the present disclosure, or perform any one of the communication methods performed on the side of the base station.

The present disclosure further provides a computer-readable storage medium. A computer program is stored in the storage medium. When the computer program is run by a processor, the communication method according to any one of the embodiments of the present disclosure can be performed.

Figure 3:
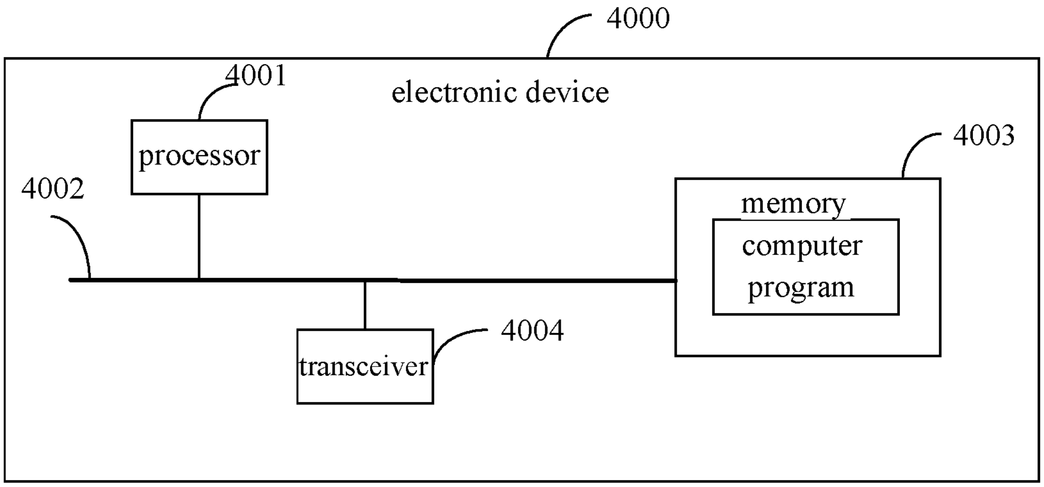
FIG. 3 is a schematic diagram of an electronic device according to the present disclosure.

As an example, FIG. 3 is a schematic diagram of an electronic device applicable to the solutions according to the present disclosure. The method according to any one of the embodiments of the present disclosure may be performed by the electronic device. As shown in FIG. 3, the electronic device 4000 includes: a processor 4001 and a memory 4003. The processor 4001 is connected to the memory 4003, for example, through a bus 4002. In some embodiments, the electronic device 4000 may further include a transceiver 4004. It is to be noted that, in practical applications, the number of the transceiver 4004 is not limited to one. The structure of the electronic device 4000 does not constitute any limitation to the embodiments of the present disclosure.

The processor 4001 may be a central processing unit (CPU), a general purpose processor, a digital signal processor (DSP), an application specific integrated circuit (ASIC), a field programmable gate array (FPGA), or another programmable logic device, a transistor logic device, a hardware component, or any combination thereof. The processor may implement or perform various illustrative logic blocks, modules, and circuits described with reference to content disclosed in the present disclosure. The processor 4001 may also be a combination to implement a computing function, for example, may be a combination of one or more microprocessors, or a combination of a DSP and a microprocessor.

The bus 4002 may include a channel to transmit information between the foregoing components. The bus 4002 may be a peripheral component interconnect (PCI) bus, an extended industry standard architecture (EISA) bus, or the like. The bus 4002 may be classified into an address bus, a data bus, a control bus, and the like. For ease of representation, only one bold line is used to represent the bus in FIG. 3, but this does not mean that there is only one bus or only one type of buses.

The memory 4003 may be a read only memory (ROM) or a static storage device of another type that can store static information and instructions, a random access memory (RAM) or a dynamic storage device of another type that can store information and instructions, or an electrically erasable programmable read only memory (EEPROM), a compact disc read only memory (CD-ROM) or other optical disk storage, optical disc storage (including a compact disc, a laser disc, an optical disc, a digital versatile disc, or a Blu-ray disc), a disk storage medium or another magnetic storage device, or any other medium that can be used to carry or store expected program code in a command or data structure form and that can be accessed by a computer, but is not limited to this.

The memory 4003 is configured to store application codes (computer programs) that execute the solution of the present disclosure, and the processor 4001 controls the execution. The processor 4001 is configured to execute the application codes stored in the memory 4003 to implement the content shown in any one of the foregoing method embodiments.

It is to be understood that, although the steps in the flow charts in the accompanying drawings are sequentially shown as indicated by arrows, the steps are not necessarily sequentially performed according to a sequence indicated by the arrows. Unless explicitly specified herein, execution of the steps is not strictly limited in the sequence, and the steps may be performed in other sequences. In addition, at least some steps in the flow charts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of another step.

The foregoing descriptions are some implementations of the present disclosure. Those ordinary skilled in the art may make several improvements and refinements without departing from the principle of the present disclosure, and the improvements and refinements shall fall within the protection scope of the present disclosure.

The invention claimed is:

1. A communication method, performed by a reduced capability user equipment (RedCap UE), comprising:

receiving random access configuration information, wherein the random access configuration information comprises configuration information of at least one set of random access resources; and determining at least one of random access resources and transmission parameters associated with random access according to the random access configuration information, wherein receiving random access configuration information comprises:

receiving the random access configuration information according to first state information of the RedCap UE, wherein the first state information comprises channel state information, wherein the channel state information comprises a synchronization signal block, SSB-based reference signal received power (Rsrp), wherein the random access configuration information comprises configuration information of two or more sets of random access resources.

2. The method according to claim 1, wherein the first state information comprises capability information.

3. The method according to claim 1, wherein determining at least one of random access resources and transmission parameters associated with random access according to the random access configuration information comprises:

determining, according to second state information of the RedCap UE, configuration information corresponding to the second state information in the configuration information of the at least one set of random access resources.

4. The method according to claim 3, wherein the second state information comprises:

capability information; and channel state information.

5. The method according to claim 2, wherein the capability information comprises at least one of:

a device type; a corresponding receiving bandwidth; a corresponding transmission bandwidth; a number of receiving antennas; or a number of transmitting antennas.

6. The method according to claim 1, wherein the configuration information of each set of random access resources comprises a channel parameter threshold of channel state information.

7. The method according to claim 6, wherein the channel parameter threshold comprises at least one of an upper threshold and a lower threshold.

8. The method according to claim 1, wherein at least one configuration parameter in the configuration information of each set of random access resources is configured differently.

9. The method according to claim 8, wherein the configuration parameter comprises:

a random access channel generic configuration;

a physical random access channel configuration index;

at least one of configuration parameters associated with at least one of random access time domain resource and frequency domain resource configurations;

a configuration parameter associated with a random access preamble; and a random access response window width.

10. The method according to claim 9, wherein the configuration parameter associated with the random access preamble comprises at least one of:

a random access preamble configuration parameter;

a random access preamble maximum transmission number;

a random access preamble transmission power; or a random access preamble transmission power ramping step.

11. A communication method, performed by a base station, comprising:

sending random access configuration information, wherein the random access configuration information comprises configuration information of at least one set of random access resources, wherein the random access configuration information comprises configuration information of at least one set of random access resources corresponding to at least one type of state information of a reduced capability user equipment (RedCap UE), wherein the state information of the RedCap UE comprises channel state information corresponding to the RedCap UE, wherein the channel state information comprises a synchronization signal block, SSB-based reference signal received power (Rsrp), the random access configuration information comprises configuration information of at least two sets of supported random access resources.

12. The method according to claim 11, wherein the state information of the RedCap UE comprises capability information of the RedCap UE.

13. The method according to claim 12, wherein the capability information of the RedCap UE comprises at least one of:

a device type; a corresponding receiving bandwidth; a corresponding transmission bandwidth; a number of receiving antennas; or data of transmitting antennas.

14. A reduced capability user equipment (RedCap UE), comprising:

a communication module configured to receive random access configuration information, wherein the random access configuration information comprises configurations corresponding to at least one set of random access resources; and a processing module configured to determine at least one of random access resources and transmission parameters associated with random access according to the random access configuration information, wherein the communication module is further configured to:

receive the random access configuration information according to first state information of the RedCap UE, wherein the first state information comprises channel state information, wherein the channel state information comprises a synchronization signal block, SSB-based reference signal received power (Rsrp), wherein the random access configuration information comprises configuration information of two or more sets of random access resources.

* * * * *